United States Patent

Downs et al.

[11] Patent Number: 5,926,110
[45] Date of Patent: Jul. 20, 1999

[54] PROGRAMMABLE OUTPUT DEVICES FOR CONTROLLING SIGNAL LEVELS IN AN RF/ID TRANSPONDER

[75] Inventors: Jeffery E. Downs, Colorado Springs, Colo.; Gregory Smith, Pearl, Miss.

[73] Assignee: Ramtron International Corporation, Colorado Springs, Colo.

[21] Appl. No.: 08/521,251

[22] Filed: Aug. 30, 1995

[51] Int. Cl.[6] ................................................. H04Q 7/00
[52] U.S. Cl. .......................... 340/825.54; 340/825.34; 340/572.1
[58] Field of Search ................ 340/825.54, 825.34, 340/825.78, 572, 572.1; 342/51; 455/69, 116

[56] References Cited

U.S. PATENT DOCUMENTS

| | | | |
|---|---|---|---|
| 4,301,445 | 11/1981 | Robinson | 340/825.54 |
| 4,857,893 | 8/1989 | Carroll | 340/572 |
| 5,245,332 | 9/1993 | Katzenstein | 340/825.54 |
| 5,430,447 | 7/1995 | Meier | 342/51 |
| 5,528,221 | 6/1996 | Jeuch et al. | 340/572 |

*Primary Examiner*—Edwin C. Holloway, III
*Attorney, Agent, or Firm*—PEter J. Meza

[57] ABSTRACT

A single integrated circuit for an RF/ID transponder includes a nonvolatile memory portion, which is ideally a ferroelectric memory, digital logic, digital interface circuitry, and differential analog driver circuitry for driving an antenna that is contained within the RF/ID transponder, but external to the integrated circuit. In series with each leg of the differential analog driver circuitry, and also fabricated on the single integrated circuit, are two groups of serially connected resistors. All circuit nodes associated with the resistors are connected to a signal level control logic block that is in communication with the on-chip digital logic block. The signal level control logic block is used to selectively control the output resistance of the driver circuitry such that a proper balance between incoming and outgoing signal levels is achieved. The output resistance can be programmed to several different levels, the granularity of the levels being determined by the number of serially connected resistors used. An optimum code corresponding to the optimum output resistance is stored in a small portion of the on-chip nonvolatile memory. The code can be externally programmed and updated as required by new applications. The code can also be externally programmed to permanently disable the RF/ID transponder by setting the output resistance to an extremely high level or by open circuiting the output resistance altogether.

20 Claims, 10 Drawing Sheets

PROGRAMMABLE OUTPUT DEVICES FOR CONTROLLING SIGNAL LEVELS IN AN RF/ID TRANSPONDER

BACKGROUND OF THE INVENTION

This invention relates generally to RF/ID ("Radio Frequency IDentification") integrated circuits, transponders, and systems. More particularly, the present invention relates to a method and circuit for controlling the level of the RF signals within an RF/ID transponder.

A prior art RF/ID transponder and reader system 10 is shown in FIG. 1, which consists of an RF/ID reader 12 and RF/ID transponder 14. The RF/ID reader 12 is typically a stationary or handheld device that transmits a signal 18 to an RF/ID transponder 14 and receives and interprets a signal 16 transmitted from the RF/ID transponder 14 back to the RF/ID reader 12. The RF/ID reader 12 generates an electrical field and modulates this field to communicate with RF/ID transponder 14. The RF/ID transponder 14 is typically a personal plastic card approximately the size of a credit card, but can also have different sizes and be used in different applications such as a luggage tag, key fob, or the like. RF/ID transponder 14 includes an antenna 20 attached to an RF/ID integrated circuit 22. The antenna 20 is typically separate from the RF/ID integrated circuit 22, but housed with the RF/ID transponder 14. Typically, a single antenna 20 is used for both transmitting data, receiving data and the generation of DC power to the integrated circuit 22. For power generation, current is induced in antenna 20 when it is placed in an electrical field that has a frequency closely matched to the antenna. This current creates a corresponding AC voltage that is rectified into a DC signal with the DC current stored in a storage capacitor (not shown in FIG. 1). The physical distance between the RF/ID reader 12 and RF/ID transponder 14 directly affects the magnitude of the generated AC signal used to power the transponder.

The RF/ID integrated circuit 22 is a single integrated circuit implemented in silicon that allows data to be read and written via modulation of an electrical field consisting of signals 16 and 18. The integrated circuit includes three basic circuit sections. An analog driver section attaches to the external antenna 20. The analog driver section is used to develop a DC voltage to power the integrated circuit 22, to modulate the electrical field for transmitting and receiving data, and to detect modulated receive data. A nonvolatile memory portion of the RF/ID integrated circuit is used to store data. Data can be read from as well as written to integrated circuit 22. Typically, the memory is nonvolatile so that information written to integrated circuit 22 is retained even if the RF/ID transponder 14 is removed from the electrical field emanating from the reader 12. A third section of RF/ID integrated circuit 22 consists of digital logic. The logic section controls the actual behavior of integrated circuit 22 and interfaces the memory section to the analog driver section.

For receiving data from the RF/ID reader 12 to the RF/ID transponder 14, the analog section of integrated circuit 22 uses the same AC voltage that is generated by antenna 20 for power generation. When frequency shift keying ("FSK") is used as a modulation technique, integrated circuit 22 measures the frequency of the generated AC voltage and generates either a logic zero or a logic one data state in the logic portion of the chip depending upon the frequency of the AC signal. The frequency and "Q" of antenna 20 is ideally matched with the modulation frequency of the received data, otherwise the maximum distance of operation between the reader 12 and integrated circuit 14 will be less than optimal.

For transmitting data from the RF/ID transponder 14 to the RF/ID reader 12, the logic portion of the RF/ID integrated circuit 22 creates a digital stream of data bits from the memory area of the integrated circuit. This stream is typically encoded using Miller or MFM encoding. This encoded digital data stream is sent to the analog section of the integrated circuit 22 for modulation and transmission. To transmit data from integrated circuit 22 to the reader 12, current is supplied to antenna 20, which causes an electrical field to be created. This field is then sensed by the RF/ID reader 12 and demodulated/decoded into a digital stream of data. Again, the frequency and "Q" of antenna 20 and the level of current pumped into the antenna determine the magnitude of the signal transmitted from RF/ID transponder 14 to the RF/ID reader 12, which ultimately determines the maximum operational distance.

One of the problems with the scheme of receiving and transmitting data with an RF/ID integrated as described with reference to FIG. 1 is that a proper balance between the receive and transmit signals must be achieved in antenna 20. An incoming carrier signal 18 is the signal that is supplied by the RF/ID reader 12. This signal generates power to the RF/ID integrated circuit 22 and is modulated between two different frequencies when data is written to the integrated circuit. The signal to the RF/ID integrated circuit 22 ("IC") is the signal (current or voltage) that flows within or appears across antenna 20. The signal within antenna 20 will be identical to the incoming carrier signal 16 as long as the RF/ID transponder 14 is not sending data back to the RF/ID reader 12. However, the signal within antenna 20 is modified whenever the RF/ID transponder 14 transmits data back to the RF/ID reader 12 by an outgoing signal 16. This modification of the signal in antenna 20 is a result of the same antenna 20 being used for both transmitting and receiving data. As is apparent from inspection of FIG. 1, the signal in antenna 20 is the sum of the incoming carrier signal 18 and the outgoing signal 16 transmitted from the RF/ID transponder 14. Consequently, the signal 16 transmitted from the RF/ID transponder 14 should be set to the correct signal amplitude to satisfy both of the following boundary conditions:

1. The maximum level of signal 16 should be set to less than a predetermined maximum level to prevent distortion of the input signal in antenna 20 and power level; and 2. The minimum level of signal 16 should be set to greater than a predetermined minimum level so that the RF/ID reader 12 can receive data from the RF/ID transponder at some acceptable operating distance.

Turning now to FIG. 4, this waveform diagram shows that when the signal 16 from the RF/ID transponder 14 is minimized, the signal 20' in antenna 20 has little distortion. This is a very good situation from the standpoint of powering up the RF/ID integrated circuit 22 and receiving data from the RF/ID reader 12. However, the situation illustrated in FIG. 4 greatly reduces the physical distance allowed between the RF/ID reader 12 and the RF/ID transponder 14 since signal 16 has a small amplitude and therefore generates only a weak electrical field.

Turning now to FIG. 5, the opposite condition is illustrated. The amplitude of signal 16 transmitted from RF/ID transponder 14 has been set to a high level. Consequently, the amplitude of signal 20' in antenna 20 has become distorted. When this happens, the RF/ID integrated circuit 22 has difficulty in receiving adequate power since the power is a direct result of the area under the signal 20' waveform, i.e. low alternate peaks in the 20' signal waveform will produce drops in the integrated circuit 22 power. In addition, when the amplitude of signal 20' is lower than the voltage thresholds of the analog circuitry on the RF/ID integrated circuit 22, the transitions of signal 20' will be lost. The loss of transitions will result in multiple undesirable consequences up to and including total loss of communication with RF/ID transponder 14.

Turning now to FIG. 6, an optimum setting for the amplitude of signal 16 is achieved. The maximum level of signal 16 is set less than the predetermined maximum level that causes distortion in signal 20', while achieving more than a minimum signal strength so that an acceptable operating distance between the RF/ID reader 12 and the RF/ID transponder 14 can be obtained.

Turning now to FIG. 2, a prior art RF/ID transponder 14 is shown that is modified in order to achieving the acceptable waveform setting shown in FIG. 6. The component parts of the RF/ID transponder 14 are shown in greater detail in FIG. 2. RF/ID transponder 14 includes an antenna 20 and an RF/ID integrated circuit 22. The circuitry fabricated on the RF/ID IC 22 includes the analog driver and digital interface section 24, digital logic section 26, and nonvolatile memory section 28. The analog driver section 24 is shown to have a differential output for driving the antenna nodes 34 and 36, respectively designated "acplus" and "acminus". Also coupled to antenna nodes 34 and 36 is a power generation block 33, which includes circuitry for converting the waveforms on this node into the VDD and GND power supply voltages used to power integrated circuit 22.

Turning momentarily to FIG. 3, the actual acplus waveform 34' and acminus waveform 36' are shown. The MFM encoding is used to change the phase of the waveforms depending on the data state that is being transmitted. For example, between time points t0 and t1, the phase of the acplus and acminus waveforms are interpreted by the RF/ID reader as a logic one. Between time points t2 and t3 the phases of the acplus and acminus waveforms have shifted by 180° and are interpreted by the RF/ID reader as a logic zero.

Turning back to FIG. 2, note that the RF/ID transponder 14 includes a set of output resistors 30 and 32 that are placed in series with the differential output of the analog driver section 24. The output resistors 30 and 32 are used to achieve the proper balance between the incoming carrier signal 16, the signal 20' in the antenna, and the outgoing signal 18. The resistance values to achieve a proper signal balance according to conditions (1) and (2) given above, several factors should be taken into account. Among these factors are principally the strength of the incoming carrier signal 16 and the desired operating distance between the reader 12 and the transponder 14.

Once the various design factors have been identified, an optimum resistance value for resistors 30 and 32 can be selected. Once the resistance value has been determined, the resistors are simply built into RF/ID transponder 14 as discrete resistances or fabricated within integrated circuit 22. The problem with this approach is that the RF/ID transponder is now permanently tied to a specific application regarding reader signal strength and operating distance. Alternatively, the resistors can be made mask programmable on integrated circuit 22, which allows for a range of operating distances to be accommodated. The problem with this approach is that metal mask programming increases cost and silicon area, as well as time to fabricate a new set of masks. Even though a range of operating conditions can be accommodated by a set of mask programmed RF/ID transponders, each individual RF/ID transponder is still limited to its particular operating conditions.

What is desired is an RF/ID transponder that can be easily programmed to respond to a wide range of RF/ID system operating conditions, without using metal mask programming.

SUMMARY OF THE INVENTION

It is, therefore, a principal object of the present invention to allow an end user of an RF/ID transponder to adjust the transmit and receive characteristics of the RF/ID transponder.

It is another object of the invention to allow an end user of an RF/ID transponder to tailor the range of operability between the RF/ID transponder and a corresponding RF/ID reader as required by a specific application.

It is another object of the invention to achieve an optimal transmit/receive setting for an RF/ID transponder that is independent of variations in processing on the RF/ID integrated circuit used in the RF/ID transponder.

It is an advantage of the invention that no new metal masks are needed, which adds cost and takes additional time resulting in a delay in the fabrication of RF/ID integrated circuits.

It is a feature of the invention that, if desired, and end user can completely disable an RF/ID transponder from future operation.

According to the present invention a single integrated circuit for an RF/ID transponder includes a nonvolatile memory portion, which is ideally a ferroelectric memory, digital logic, digital interface circuitry, and differential analog driver circuitry for driving an antenna that is contained within the RF/ID transponder, but external to the integrated circuit. In series with each leg of the differential analog driver circuitry, and also fabricated on the single integrated circuit, are two groups of serially connected resistors. All circuit nodes associated with the resistors are connected to a signal level control logic block that is in communication with the on-chip digital logic block. The signal level control logic block is used to selectively control the output resistance of the driver circuitry such that a proper balance between incoming and outgoing signal levels is achieved. The output resistance can be programmed to several different levels, the granularity of the levels being determined by the number of serially connected resistors used. An optimum code corresponding to the optimum output resistance is stored in a small portion of the on-chip nonvolatile memory. The code can be externally programmed and updated as required by new applications. The code can also be externally programmed to permanently disable the RF/ID transponder by setting the output resistance to an extremely high level or by open circuiting the output resistance altogether.

The foregoing and other objects, features and advantages of the invention will become more readily apparent from the following detailed description of a preferred embodiment of the invention which proceeds with reference to the accompanying drawings.

DETAILED DESCRIPTION

Figure 1:
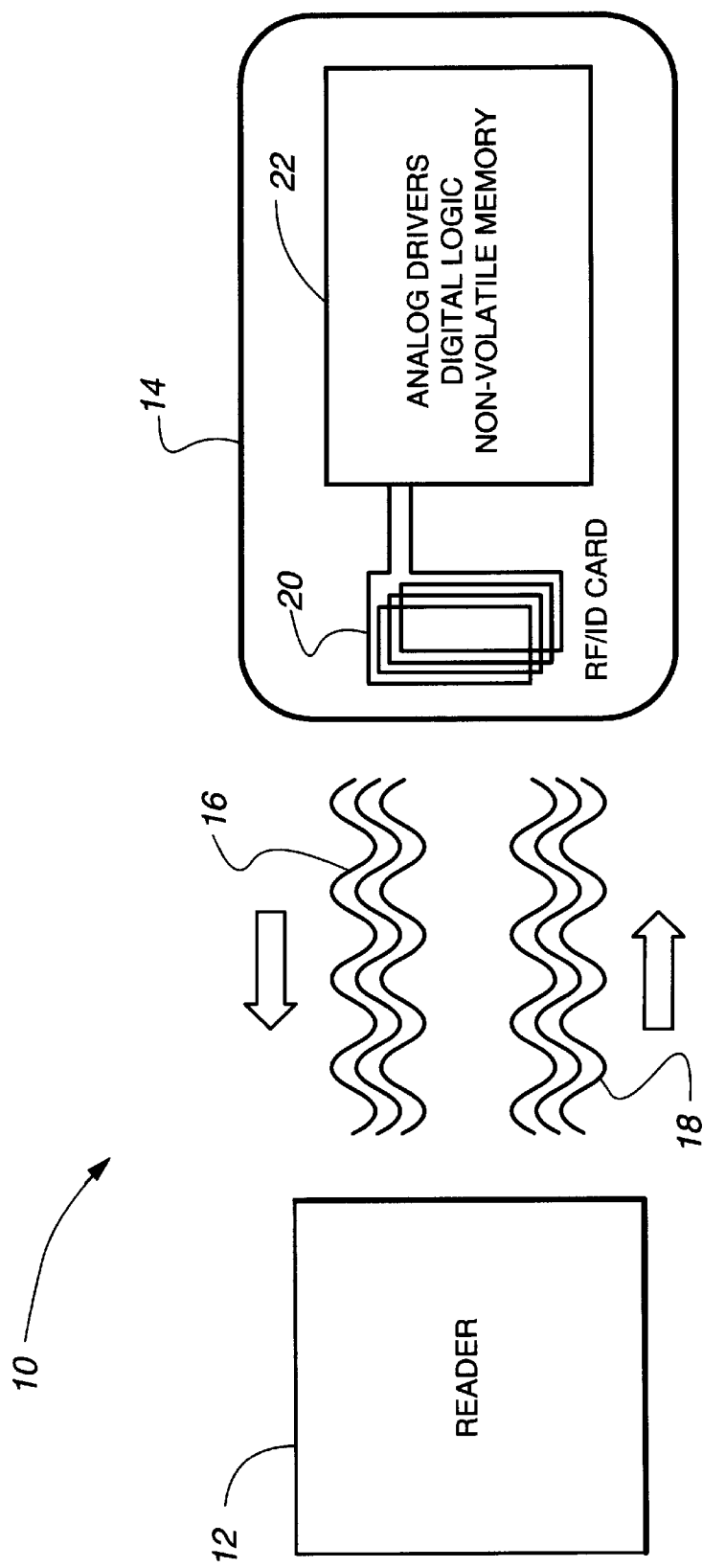
FIG. 1 is a block diagram of a prior art RF/ID transponder and reader system.
Figure 2:
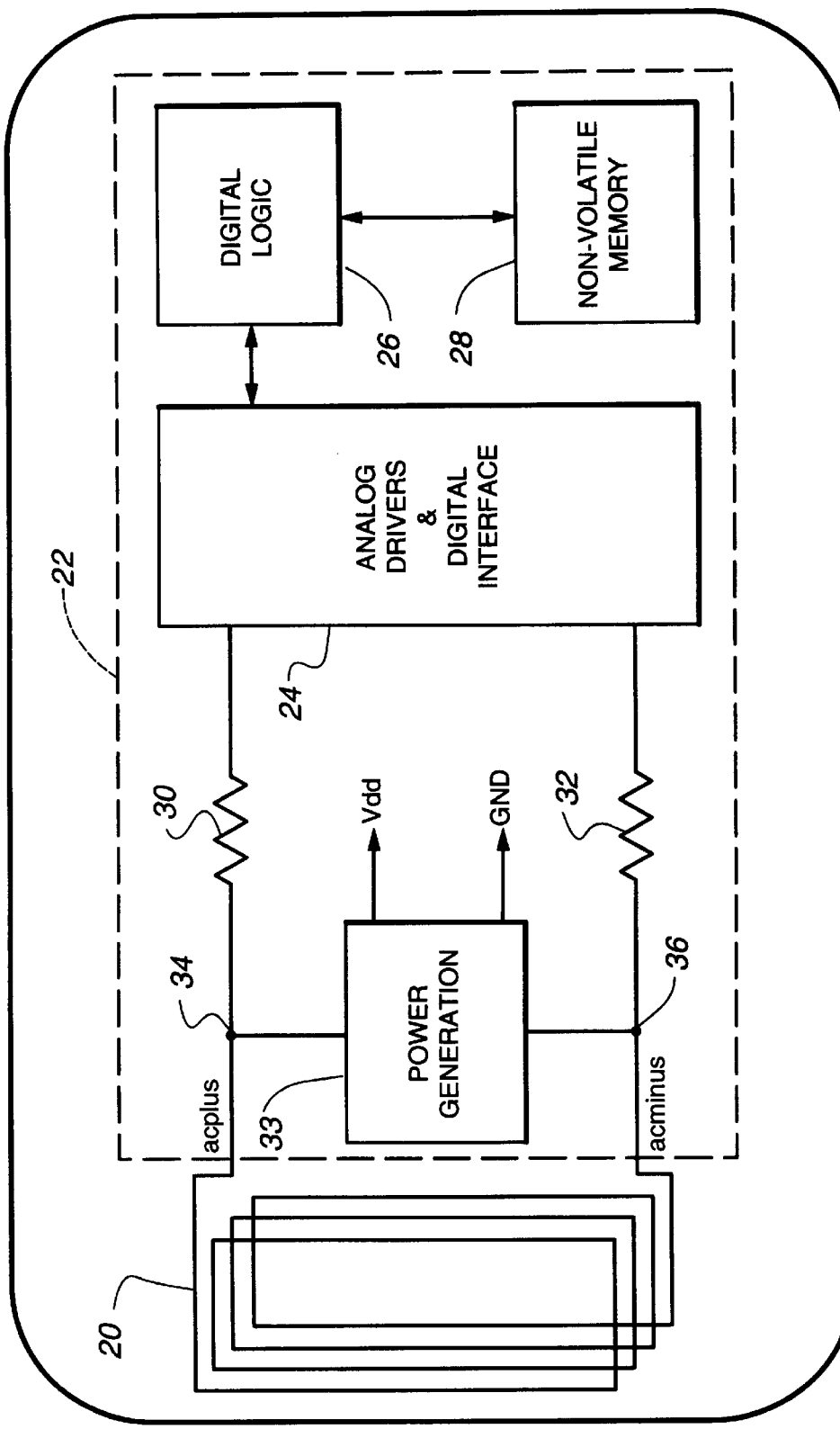
FIG. 2 is a more detailed block/schematic diagram of the prior art RF/ID transponder shown in FIG. 1.
Figure 3:
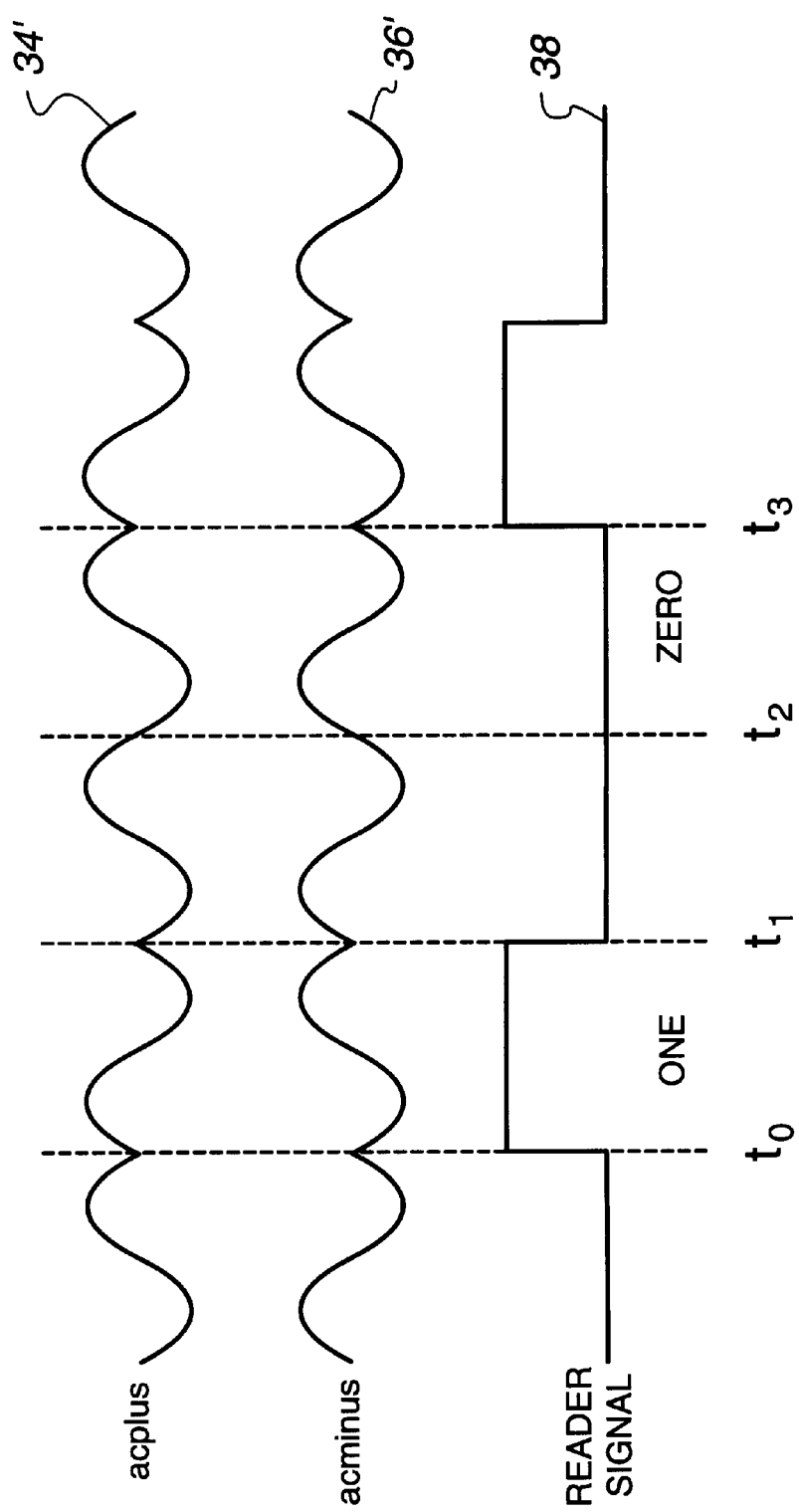
FIG. 3 is a waveform diagram associated with the RF/ID transponder and reader system of FIG. 1.
Figure 4:
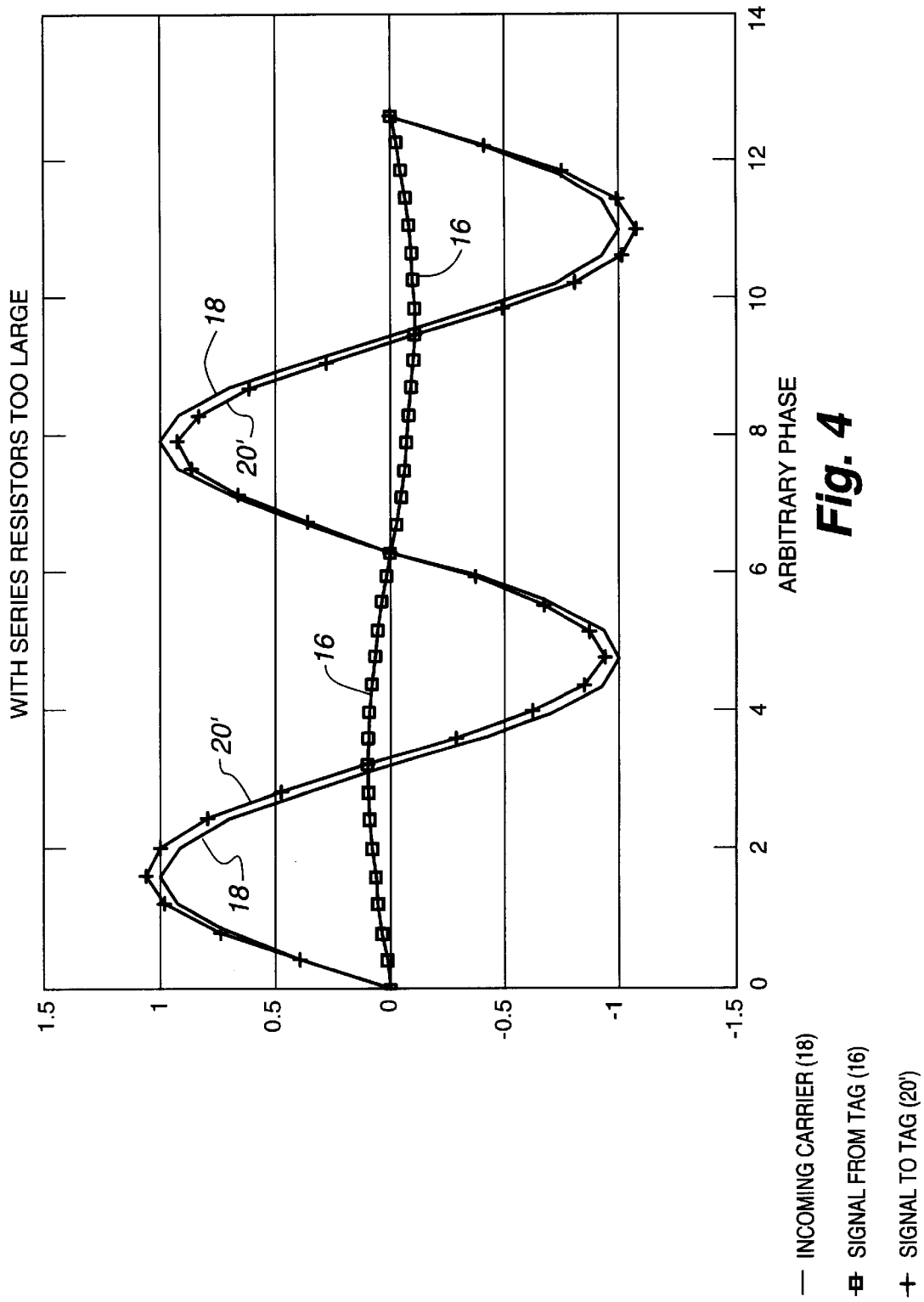
FIGS. 4–6 are waveform diagrams associated with RF/ID transponder and reader system of FIG. 1 that illustrate the receive/transmit characteristics of the RF/ID transponder for three separate antenna driver output impedance settings.
Figure 5:
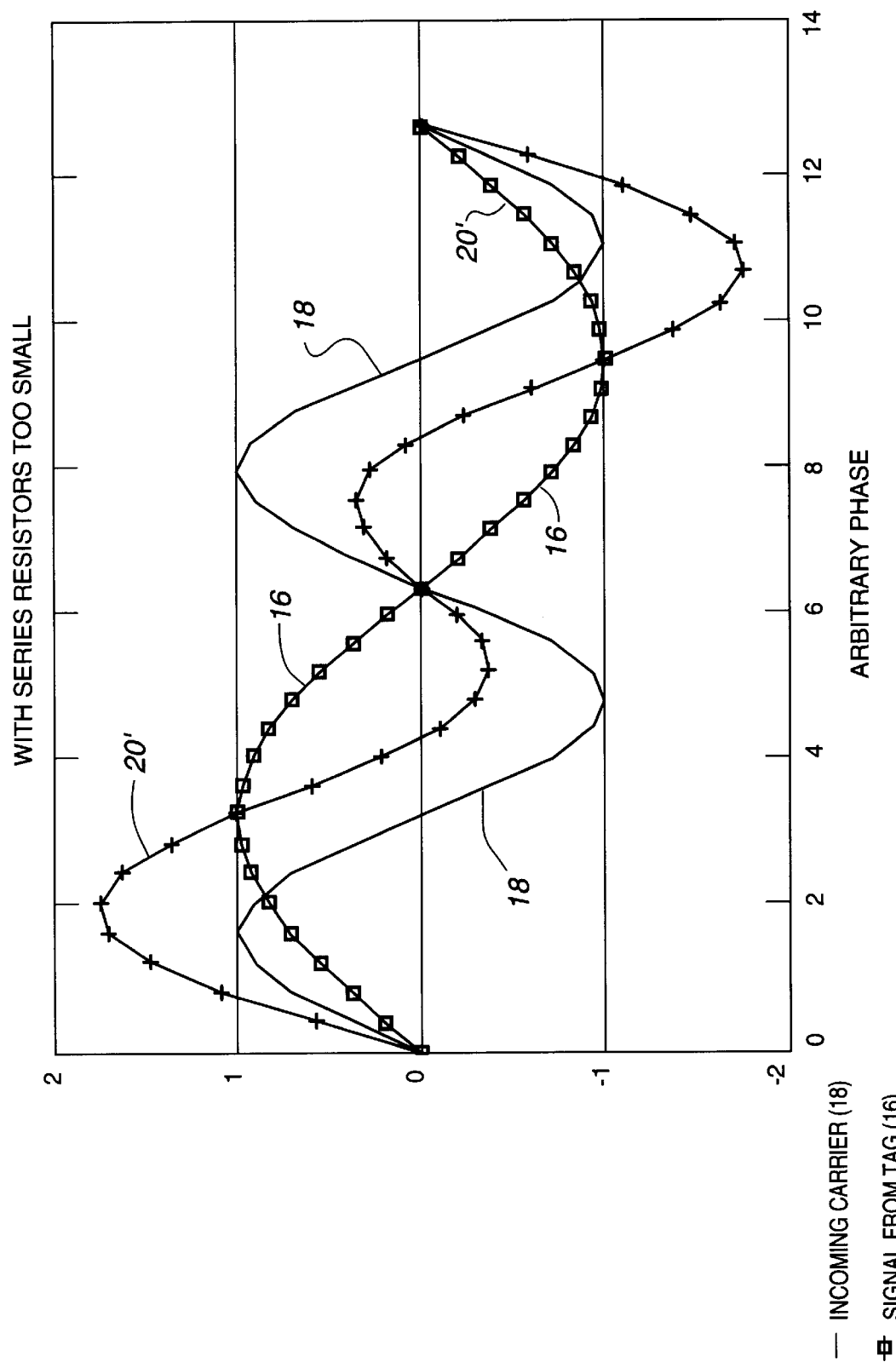
Figure 6:
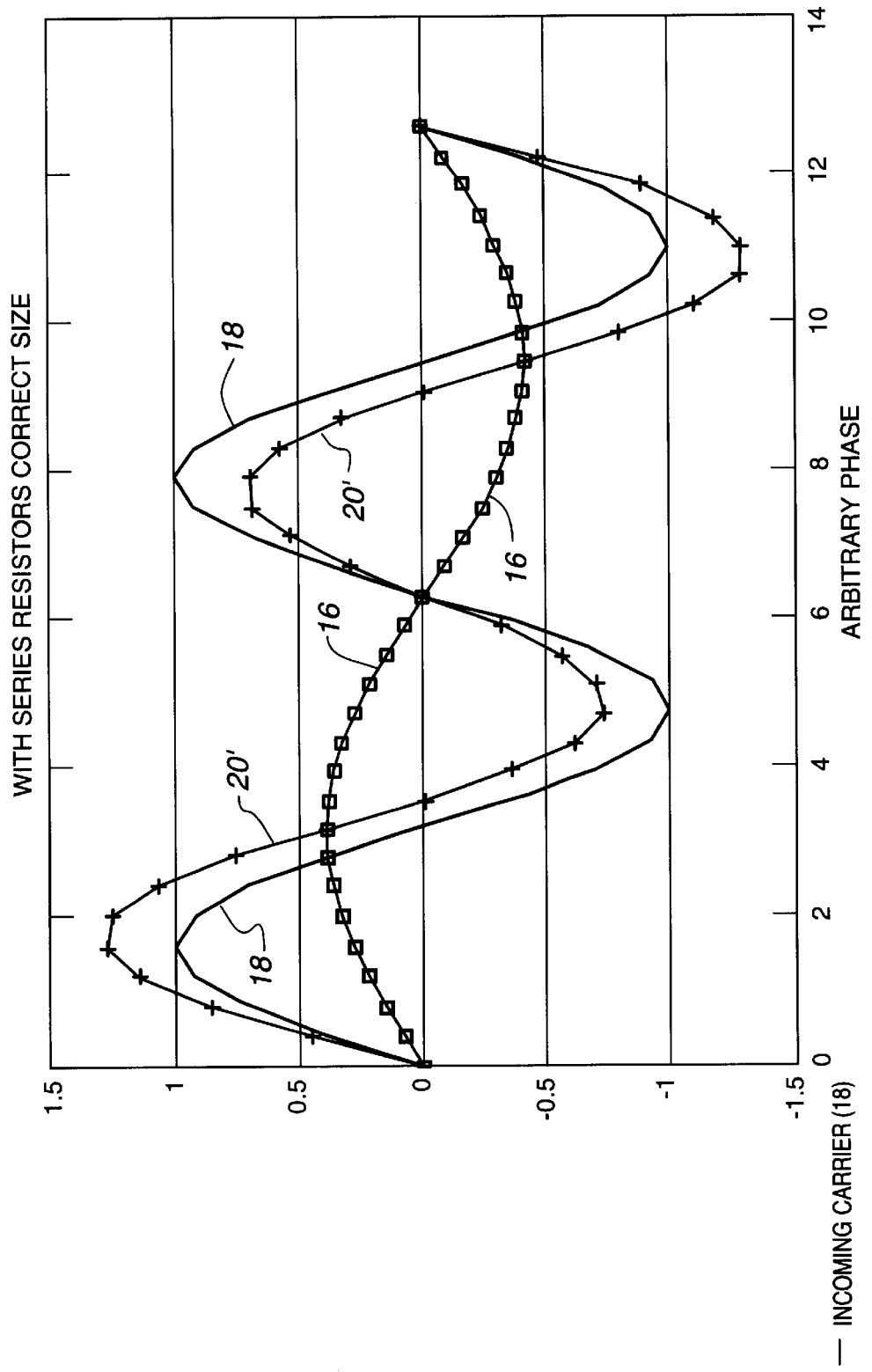
Figure 7:
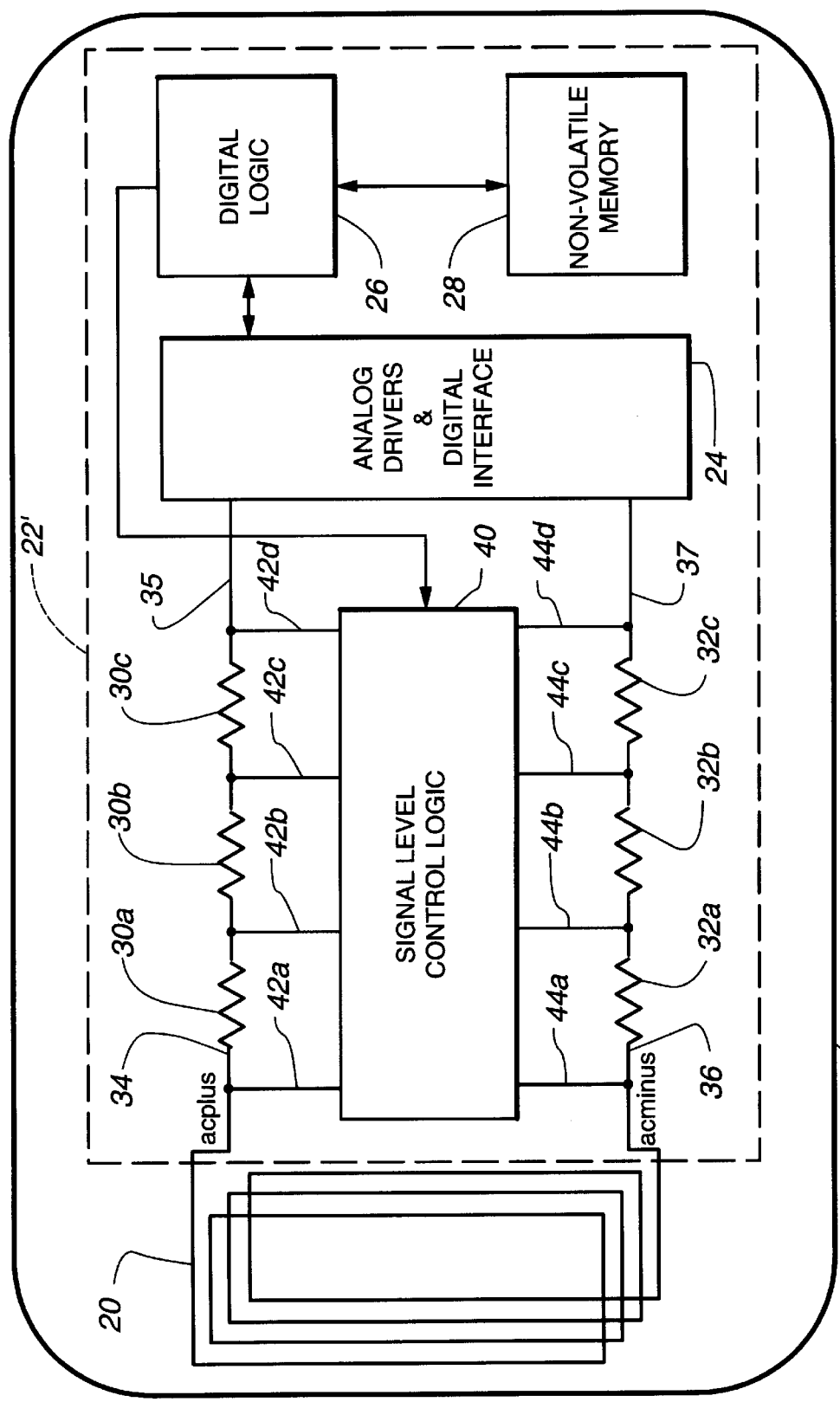
FIG. 7 is a block/schematic diagram of an RF/ID transponder modified according to the present invention.

To allow programmable adjustment of the receive and transmit characteristics of the RF/ID transponder 14, the RF/ID integrated circuit configuration shown in FIG. 7 is used. The amplitude of signal 16 transmitted from RF/ID transponder 14 is adjusted via the series resistors 30a–30c and 32a–32c, which are in series with the output of the analog driver and digital interface section 24. Resistors 30a–30c and 32a–32c limit the amount of current that flows into antenna 20, which in turn limits the induced voltage and electrical field. In the present invention, the current limiting resistor settings, i.e. the total series output resistance, is field programmable by the end user of the RF/ID system through a writable configuration word, which is stored in nonvolatile memory section 28 of integrated circuit 22'. By writing to the RF/ID integrated circuit 22' via the normal RF protocol, the amplitude of the signal 16 transmitted by the RFJID transponder 14 can be adjusted. Once the new total value of the current limiting resistance is selected via a transmitted RF command, the value is stored in the nonvolatile memory section 28 and is used in all future operations of the RF/ID transponder 14. A new RF command can be transmitted to update the resistance setting for more optimum operation under different operating conditions. Additionally, a "quiet command" can be transmitted to open circuit the output resistance, thus rendering the RF/ID transponder 14 inoperable. These techniques, as well as the configuration of the programmable resistance circuit is described in detail below.

An integrated circuit 22' suitable for use in RF/ID transponder 14 include a driver section and digital interface 24, which has a differential output at nodes 35 and 37. The driver section provides the current drive to antenna 20, but also receives a signal from antenna 20 and converts this signal to a digital stream of bits. Thus, the driver section 24 is in bidirectional communication with the digital logic block 26. Two groups of serially coupled resistors are placed in series with each of the legs of the differential output of driver section 24. A first group of resistors 30a–30c has a first end coupled to one of the legs of the differential output of the driver section at node 35 and a second end for driving antenna 20 at node 34, which is designated acplus. A second group of resistors 32a–32c has a first end coupled to the other of the legs of the differential output of the driver section at node 37 and a second end for driving antenna 20 at node 36, which is designated acminus. A signal level control logic block 40 is coupled to each of the resistor groups through leads 42a–42d and 44a–44d. Signal level control block 40 is electrically programmable through antenna 20, digital logic section 26, and nonvolatile memory section 28. The total resistance of each of the resistor groups is controlled by signal level control block 40 in response to the code delivered via control bus 25.

Figure 8:
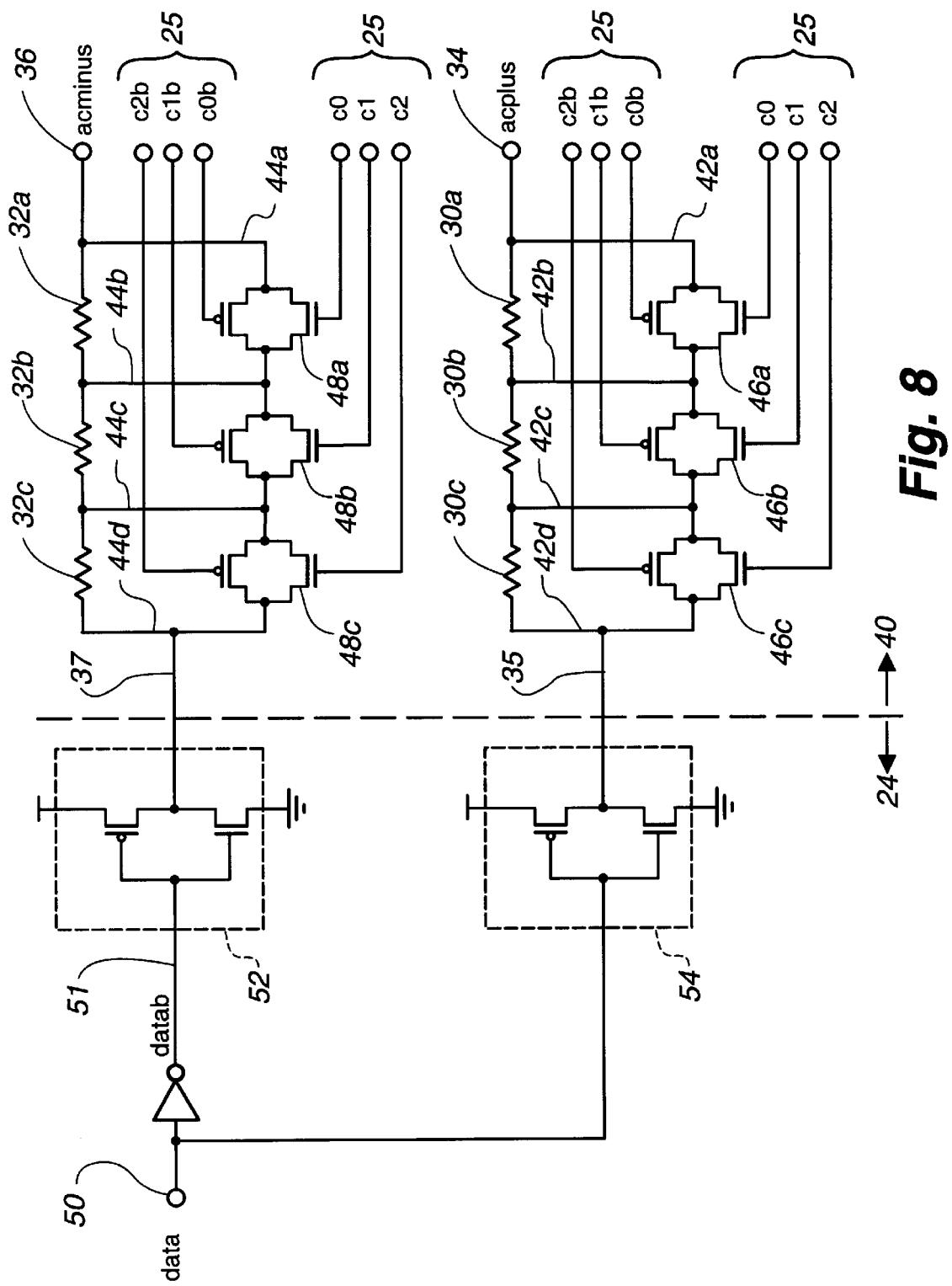
FIG. 8 is a detailed schematic diagram of a portion of the antenna driver circuit and its associated controllable output impedance for the RF/ID transponder shown in FIG. 7.

Referring now to FIG. 8, a portion of the output driver section 24 transistor-level schematic and the entirety of the control block 40 schematic are shown. Signal level control block 40 includes two groups of transistor switches 46a–46c and 48a–48c respectively coupled to the two groups of resistors 30a–30c and 32a–32c for selectively shorting the resistors in each resistor group. Control leads c0–c2 and c0b–c2b carry the digital information to control the switches in control block 40 and form the digital control bus 25. Each switch 46a–46c and 48a–48c is an MOS transistor switch. Ideally, each transistor switch is the parallel combination of a P-channel MOS transistor switch and an N-channel MOS transistor switch, which allows full voltage swing of the signal. Each switch is serially coupled to the next switch, and there is one switch for every resistor in each resistor group. In the resistor group coupled to acplus node 34, switch 46a is connected to resistor 30a through leads 42a and 42b. Thus, resistor 30a can be selectively shorted out and removed from the total resistance value by activating leads c0 and c0b. In this case, c0 is taken to a logic one and c0b is taken to a logic zero to close transistor switch 46a. The next switch 46b in the series is connected to resistor 30b through leads 42b and 42c. Thus, resistor 30b can be selectively shorted out and removed from the total resistance value by activating leads c1 and c1b. In this case, c1 is taken to a logic one and c1b is taken to a logic zero to close transistor switch 46a. Similarly, the next switch 46c is coupled to resistor 30c for selective shorting through leads 42c and 42d. In the resistor group coupled acminus node 36, switch 48a is coupled to resistor 32a through leads 44a and 44b, switch 48b is coupled to resistor 32b through leads 44b and 44c, and switch 48c is coupled to resistor 32c through leads 44c and 44d. Each of the resistors in the group are also selectively shorted through the appropriate digital signals on bus 25.

Each resistor, therefore, has a companion transistor switch or "pass gate" which can be used to short out the resistor, effectively removing it from the circuit. The pass gates are controlled by setting or clearing the output of a matching flip-flop (not shown). In turn, the flip-flops are loaded during the initial power up of the RF/ID transponder 14 with a three bit value which is stored in nonvolatile memory 28. The three bit value allows eight different output or "current limiting" resistor combinations.

Also shown in FIG. 8 is a portion of the analog driver section 24. Digital data is received on node 50 from digital logic section 26. The data signal is inverted at node 51 to form the datab signal. The data and datab signals are used to drive output inverter/drivers 52 and 54, which are sized appropriately to drive the load of antenna 20. Note that the inputs of inverters 52 and 54 are driven with opposite data states in order to maintain a differential output. The differential output at nodes 35 and 37 is a digital signal, and the differential output at nodes 34 and 36 (acplus and acminus, respectively) is an "analog" signal, in that the sharp edges of the digital signal have been filtered by the action of the antenna 20 and a tuning capacitor coupled between nodes 34 and 36 (not shown in FIG. 8).

Figure 9:
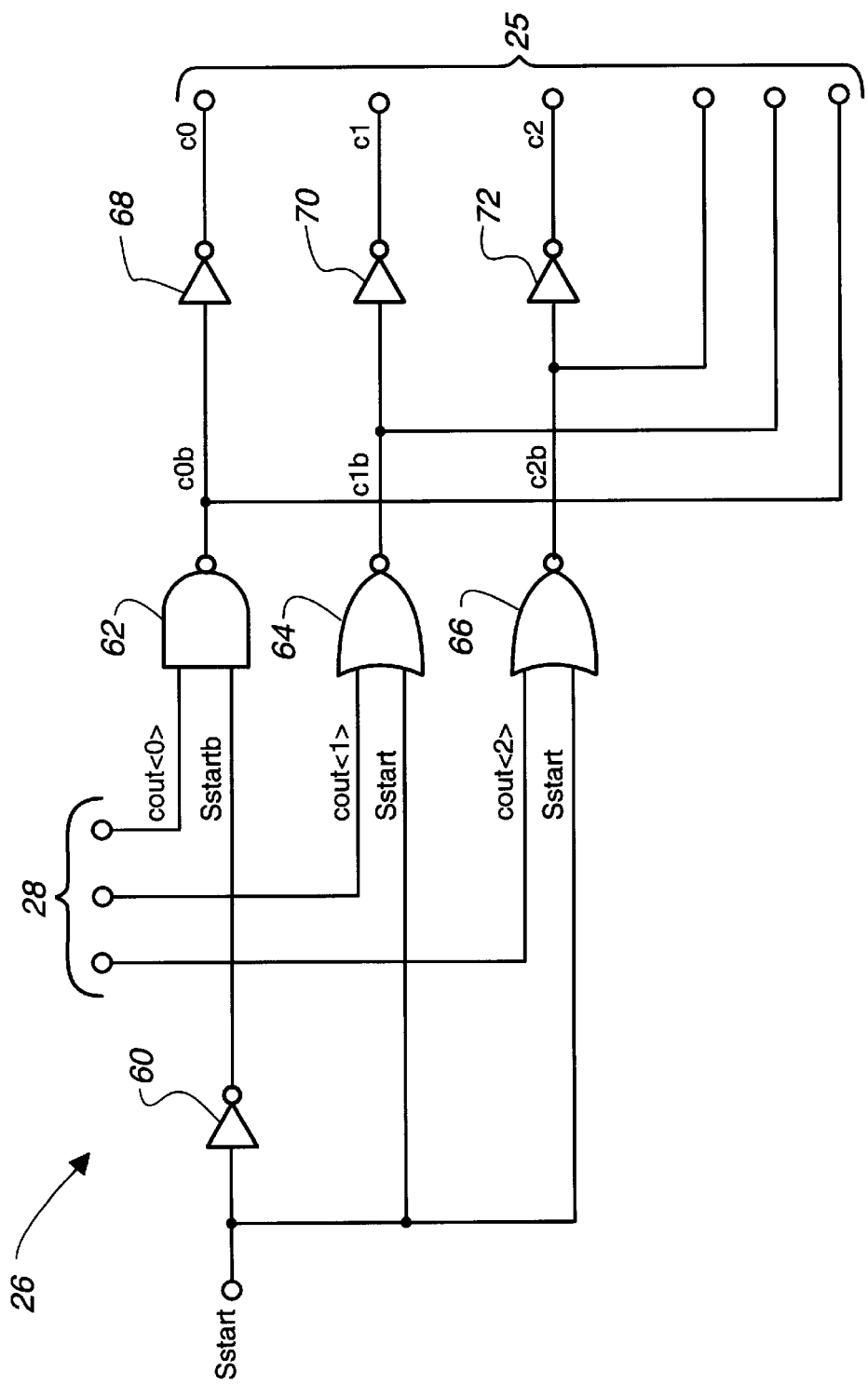
FIG. 9 is a detailed schematic diagram of a portion of a digital circuit block used in controlling the output impedance of the driver circuit shown in FIG. 8.

A portion of the logic block 26 is shown in FIG. 9 that provides the signal on the digital bus 25. The portion of logic block 26 shown in FIG. 9 receives a digital code from the nonvolatile memory 28. In the embodiment described in the present invention, there are three serial resistors that can be selectively shorted in any combination, so a total of three bits are needed. The three bits of nonvolatile code are provided from memory 28 on leads labeled cout<0>, cout<1> and cout<2>, which are coupled to NAND gate 62, NOR gate 64, and NOR gate 66, respectively. Also directly coupled to NOR gates 64 and 66 are leads carrying the Sstart signal, which originates in digital logic block 26. The inverted Sstart signal, Sstartb, is provided to NAND gate 62 through inverter 60. The outputs of gates 62–66 is the c0b, c1b, and c2b signals, respectively. These signals are inverter through inverters 68–72 to provide the c0, c1, and c2 signals. Signals c0b–c2b and c0–c2 form the digital bus 25. In sum, the portion of logic block 26 shown in FIG. 9 converts the digital code from nonvolatile memory 28 and the Sstart signal into the digital signals used to programmably control the switches in the signal level control logic block Sstart is a signal that forces integrated circuit 22 into a power-down mode. When Sstart is asserted, integrated circuit 22 only transmits an unencoded signal back to the reader 12. During this transmission, the output resistors 30 and 32 are set to some specific pre-determined value. This value is not necessarily the same as the pre-programmed value stored in nonvolatile memory 28. In the preferred embodiment, it is desirable to transmit the carrier back to the reader 12 until a sufficient power level in the transponder 14 is achieved. Once this power level has been achieved, Sstart is de-asserted, allowing the pre-programmed value from non-volatile memory 28 to set the value of resistors 30 and 32.

In the preferred embodiment, output resistors 30a and 32a are 13.3 Kohms, resistors 30b and 32b are 6.6 Kohms, resistors 30c and 32c are 3.3 Kohms, the antenna is an inductive coil having a value of about 400 millihenries, and the distance from transponder 14 to the reader 12 is about 2 to 10 centimeters.

Figure 10A:
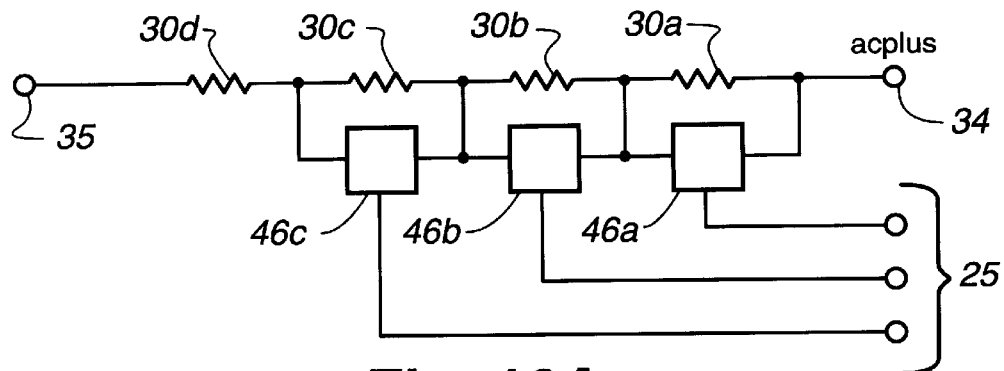
FIGS. 10A–10C illustrate three alternative controlled output impedances for the antenna driver circuit shown in FIG. 8.

Referring now to FIG. 10A one of the two groups of serially coupled resistors is shown, but altered to include a preset, nonadjustable minimum resistance. The resistor group shown includes resistors 30a–30c coupled between circuit nodes 34 and 35 and associated switches 46a–46c. The other resistor group is not shown since it is identical. In FIG. 10A, an additional resistor 30d is provided in series connection with resistors 30a30c. This minimum resistance insures that the signal transmitted by transponder 14 cannot exceed a predetermined maximum level, above which distortion of the input and power signals may occur. Note that there is no switch associated with resistor 30d, and so this resistor cannot be selectively shorted out with a programming command from the reader.

Figure 10B:
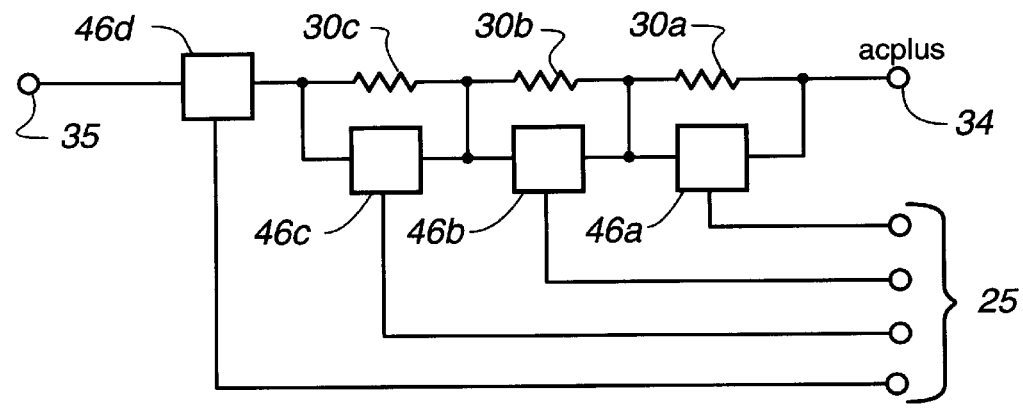

Referring now to FIG. 10B one of the two groups of serially coupled resistors is shown, but altered to include an extra serially connected switch 46d for completely open-circuiting each of the groups of resistors. The resistor group shown includes resistors 30a–30c coupled between circuit nodes 34 and 35 and associated switches 46a–46c. The other resistor group is not shown since it is identical. In FIG. 10B, an additional transistor switch 46d is provided in series connection with resistors 30a–30c. This extra transistor switch enables the RF/ID transponder 14 to respond to a transmitted "quiet command" that opens transistor switch 46d in response to the appropriate digital signal on digital bus 25. Once transistor switch 46d is opened, the RF/ID transponder is rendered inoperable since no further data can be transmitted. This feature may be useful in applications such as access control or preventing fraud in financial transactions.

Figure 10C:
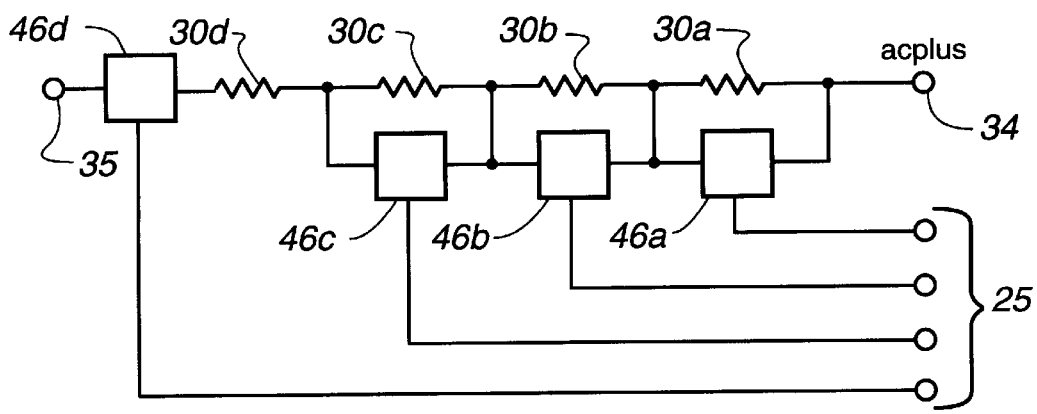

Referring now to FIG. 10C, an alternative resistor group is shown that includes both serially connected additional resistor 30d and transistor 46d. In this transponder the RF/ID transponder 14 would have both the "quiet command" and user programmable range features.

In operation, the method of operating the RF/ID transponder 14 according to the present invention enables the end user to properly adjust the receive/transmit characteristics of the transponder 14. The method includes the steps of first transmitting a code to the RF/ID transponder 14 corresponding to a desired output impedance 30a–30c and 32a–32c in series with the output of the antenna driving circuit 24 resident within the RF/ID transponder 14. The next step in the method is storing the code in nonvolatile memory 28 in the RF/ID transponder 14, and then adjusting the output impedance 30a–30c and 32a–32c in response to the code stored in the nonvolatile memory 28. The output impedance 30a–30c and 32a–32c is adjusted by selectively shorting resistor segments in the output impedance of the antenna driving circuit 24. If desired, the code can be updated so the RF/ID transponder 14 can be used in a different application with, for example, a shorter or longer maximum distance between transponder and reader. To accomplish this, the method includes the steps of retransmitting a new code to the RF/ID transponder 14 corresponding to a new desired output impedance 30a–30c and 32a–32c in the antenna driving circuit 24 resident within the RF/ID transponder 14, storing the new code in nonvolatile memory 28 in the RF/ID transponder, and readjusting the output impedance 30a–30c and 32a–32c in response to the new code stored in the nonvolatile memory. In the preferred embodiment, RF/ID transponder 14 is either powered down or reset before the new output resistance is in effect. Also, if desired the method of operation may include the step of transmitting a quiet code to the RF/ID transponder 14 that disables the RF/ID transponder 14 by open-circuiting the output impedance 30a–30c and 32a–32c of the antenna driving circuit 24.

It will be appreciated by those skilled in the art that there is no need with the method of the present invention to recut metal masks to adjust the amplitude of signal 16 transmitted by RF/ID transponder 14. The electrical programming of the present invention allows an optimal setting of output resistance that is independent of variations in semiconductor processing on the RF/ID integrated circuit 22', which may be present if the total value of the on-chip output resistance is fixed. Also, developing new metal masks costs money and takes additional time, which can delay fabrication of the RF/ID integrated circuit 22'.

In the present invention, the transmit and receive characteristics of the RF/ID transponder 14 can be easily adjusted by the end user. Range of the RF/ID transponder 14 to the RF/ID reader can be tailored to the specific application. In some situations, a reduced transmit/receive range is desirable. With the method of the present invention, the range can be easily changed without any IC redesign using the eight possible different output resistor settings.

Having described and illustrated the principles of the invention in a preferred embodiment thereof, it is appreciated by those having skill in the art that the invention can be modified in arrangement and detail without departing from such principles. For example, the number of output resistor segments can be increased for finer control over the receive/transmit characteristics of the RF/ID transponder. Further, the exact manner in which the digital control for the switches in the signal level control logic block can be changed. While parallel transistor switches are desirable, other types of switches can be used. Also, while ferroelectric memory for the nonvolatile memory is desirable, other types of nonvolatile memory such as EEPROMs can be used. We therefore claim all modifications and variation coming within the spirit and scope of the following claims.

We claim:

1. An integrated circuit suitable for use in an RF/ID transponder comprising:

a driver section having a differential output;

two groups of serially coupled resistors, each group having a first end coupled to the differential output of the driver section and a second end for driving an antenna; and electrically programmable means for adjusting the total resistance of each of the group of resistors.

2. An integrated circuit as in claim 1 in which the means for adjusting the total resistance comprises:

two groups of switches respectively coupled to the two groups of resistors for selectively shorting the resistors in each resistor group; and means for controlling the switches.

3. An integrated circuit as in claim 2 in which the means for controlling the switches comprises:

digital logic control circuitry coupled to the switches; and nonvolatile memory for supplying a code to the digital logic control circuitry.

4. An integrated circuit as in claim 1 in which each group of serially coupled resistors has a nonadjustable minimum resistance.

5. An integrated circuit as in claim 1 further comprising means for open-circuiting each of the groups of resistors.

6. An RF/ID transponder having externally programmable receive/transmit characteristics comprising:

an antenna for receiving and transmitting electrical signals;

a driver section having a differential output;

two groups of serially coupled resistors, each group having a first end coupled to the differential output of the driver section and a second end coupled to the antenna;

a nonvolatile memory for storing a code representing the desired resistance value of each of the resistor groups; and means for controlling the total resistance of the resistor groups according to the code stored in the nonvolatile memory.

7. An RF/ID transponder as in claim 6 in which the driver section, resistor groups, nonvolatile memory, supplying means and controlling means are fabricated on a single integrated circuit.

8. An RF/ID transponder as in claim 6 in which the controlling means comprises:

two groups switches respectively coupled to the two groups of resistors for selectively shorting the resistors in each resistor group; and means for controlling the switches according to the code stored in the nonvolatile memory.

9. An RF/ID transponder as in claim 8 in which each group of switches comprises a plurality of serially coupled switches equal to the number of resistors in the respective resistor group.

10. An RF/ID transponder as in claim 8 in which at least one of the switches comprises an MOS transistor switch.

11. An RF/ID transponder as in claim 8 in which at least one of the switches comprises the parallel combination of a P-channel MOS transistor switch and an N-channel MOS transistor switch.

12. An RF/ID transponder as in claim 6 in which the nonvolatile memory comprises a ferroelectric memory.

13. An RF/ID transponder as in claim 6 in which the nonvolatile memory is coupled to an input bus of the driver section.

14. An RF/ID transponder as in claim 13 in which the nonvolatile memory stores a code representing the desired resistance value of each of the resistor groups and data that is supplied to the input bus of the driver section.

15. An integrated circuit as in claim 6 in which each resistor group has a nonadjustable minimum resistance.

16. An integrated circuit as in claim 6 further comprising means for open-circuiting each of the resistor groups.

17. A method of operating an RF/ID transponder to properly adjust the receive/transmit characteristics of the transponder, the method comprising the steps of:

transmitting a code to the RF/ID transponder corresponding to a desired output impedance in an antenna driving circuit resident within the RF/ID transponder;

storing the code in nonvolatile memory in the RF/ID transponder; and adjusting the output impedance in response to the code stored in the nonvolatile memory.

18. The method of claim 17 in which the adjusting step comprises the step of selectively shorting resistor segments in the output impedance of the antenna driving circuit.

19. The method of claim 17 further comprising the steps of:

retransmitting a new code to the RF/ID transponder corresponding to a new desired output impedance in the antenna driving circuit resident within the RF/ID transponder;

storing the new code in nonvolatile memory in the RF/ID transponder; and readjusting the output impedance in response to the new code stored in the nonvolatile memory.

20. The method of claim 17 further comprising the step of transmitting a quiet code to the RF/ID transponder that disables the RF/ID transponder by open-circuiting the output impedance of the antenna driving circuit.

* * * * *